(12) United States Patent
Wu et al.

(10) Patent No.: US 6,618,542 B2
(45) Date of Patent: Sep. 9, 2003

(54) SEALING ASSEMBLY FOR USE WITH AN OPTICAL FIBER HOLDER

(75) Inventors: Kun-Tsan Wu, Tu-Chen (TW); Chien Cheng Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/040,749

(22) Filed: Dec. 28, 2001

(65) Prior Publication Data

US 2002/0061170 A1 May 23, 2002

(30) Foreign Application Priority Data

Oct. 31, 2001 (TW) ........................................ 90218610 U

(51) Int. Cl.$^7$ ................................................ G02B 6/00
(52) U.S. Cl. ...................................... 385/138; 385/135
(58) Field of Search ................................ 385/138, 135

(56) References Cited

U.S. PATENT DOCUMENTS

| | | | | |
|---|---|---|---|---|
| 5,450,519 A | * | 9/1995 | Iwanski et al. ............. | 385/138 |
| 5,556,060 A | * | 9/1996 | Bingham et al. ............. | 248/49 |
| 5,661,833 A | * | 8/1997 | Omati ......................... | 385/88 |
| 5,732,180 A | * | 3/1998 | Kaplan ....................... | 385/135 |
| 5,825,961 A | * | 10/1998 | Wilkins et al. ............. | 385/135 |
| 5,907,653 A | * | 5/1999 | Burek et al. ................ | 385/135 |
| 6,201,922 B1 | * | 3/2001 | Milanowski et al. ....... | 385/135 |
| 6,487,344 B1 | * | 11/2002 | Naudin et al. ............. | 385/100 |
| 2002/0064329 A1 | * | 5/2002 | Sobiski et al. ............. | 385/11 |

* cited by examiner

*Primary Examiner*—Michael C. Zarroli
(74) *Attorney, Agent, or Firm*—Wei Te Chung

(57) ABSTRACT

An optical fiber device (1) includes an upper cover (18), a lower cover (19), and two optical fiber holders (2). Each optical fiber holder includes a retaining body (10), a strain relief boot (20), and an interconnection member (30). A passage is defined in each optical fiber holder, for receiving a plurality of optical fibers therethrough. An inner rib (311) is formed on an inner surface of the interconnection member, and is engagingly received in a groove (112) defined in a front portion of the retaining body. Two parallel outer ribs (321) are formed on an outer surface of the interconnection member, and are engagingly received in corresponding grooves (162) defined in the upper and lower covers. An engaging bead (211) is formed at a front end of the strain relief boot, and is engagingly received in a rear groove (123) defined in an intermediate portion of the retaining body.

5 Claims, 6 Drawing Sheets

SEALING ASSEMBLY FOR USE WITH AN OPTICAL FIBER HOLDER

BACKGROUND OF THE INVENTION

1. Field of the Invention

The present invention relates to optical fiber devices, and particularly to an optical fiber device incorporating optical fiber holders for protecting optical fibers retained therein.

2. Description of Related Art

Nowadays optical fiber devices are being widely used in communications applications because of inherent advantages including high bandwidth, small size, light weight, immunity to electromagnetic interference, and ruggedness. However, optical fibers are generally made of glass which is thin and fragile. Optical fibers are prone to bend and sustain signal loss or even breakage. An optical fiber device is generally packaged to isolate the device from external impact and influence that may adversely affect operation of the device. Ideally, no signal loss or breakage occurs.

Generally, optical fiber entry and exit points of a packaged optical fiber device are each protected with an additional optical fiber holder for shielding against external impact and influence. There are two main mechanisms for attaching the optical fiber holder to the packaged optical device. In the first mechanism, the optical fiber holder is soldered to the packaged optical device. In the second mechanism, the optical fiber holder is fixed to the packaged optical device by interengagement of screw threads of each part. However, soldering is time-consuming, and renders disassembly impracticable. Furthermore, interengagement of screw threads does not necessarily result in an airtight joint.

SUMMARY OF THE INVENTION

Accordingly, an object of the present invention is to provide an optical fiber device incorporating a pair of optical fiber holders which are airtight.

Another object of the present invention is to provide an optical fiber holder which has a simple structure and is easy to manufacture.

In order to achieve the objects set above, an optical fiber device in accordance with the present invention comprises an upper cover, a lower cover and a pair of optical fiber holders. Each optical fiber holder comprises a retaining body, a strain relief boot and an interconnection member. A front portion of the retaining body is engaged in the interconnection member, which is in turn retained in one of opposite ends of the optical fiber device. A rear portion of the retaining body is engaged in the strain relief boot. A passage is defined through the optical fiber holder, for receiving a plurality of optical fibers therethrough. An annular inner rib is formed on an inner surface of the interconnection member, and is engagingly received in an annular groove defined in the front portion of the retaining body. Two parallel annular outer ribs are formed on an outer surface of the interconnection member, and are engagingly received in corresponding semi-annular grooves defined in the upper and lower covers. An annular engaging bead is formed at a front end of the strain relief boot, and is engagingly received in an annular rear groove defined in an intermediate portion of the retaining body.

Other objects, advantages and novel features of the invention will become more apparent from the following detailed description when taken in conjunction with the accompanying drawings, in which:

DETAILED DESCRIPTION OF THE PREFERRED EMBODIMENT

Reference will now be made to the drawings to describe the present invention in detail.

Figure 1:
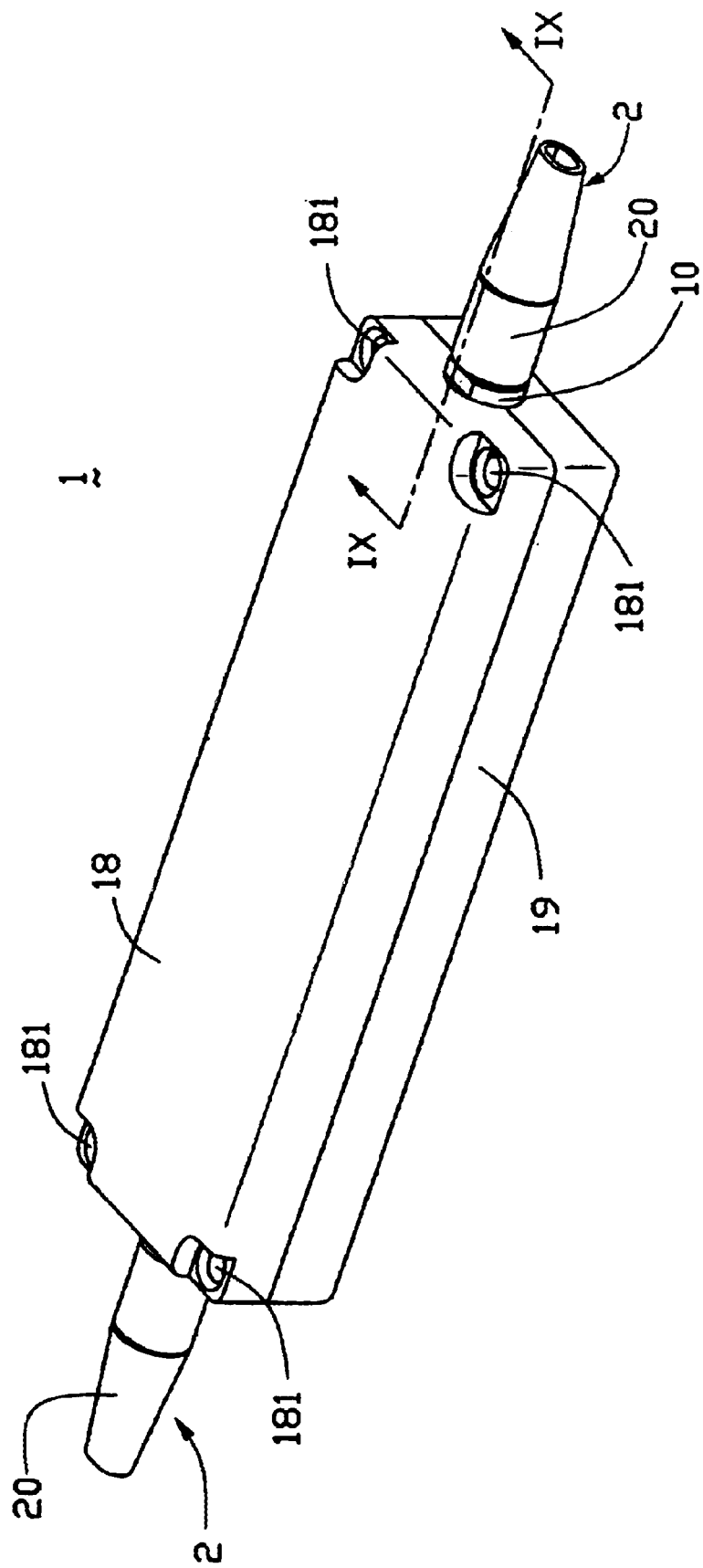
FIG. 1 is a perspective view of an optical fiber device incorporating two optical fiber holders in accordance with the present invention.
Figure 2:
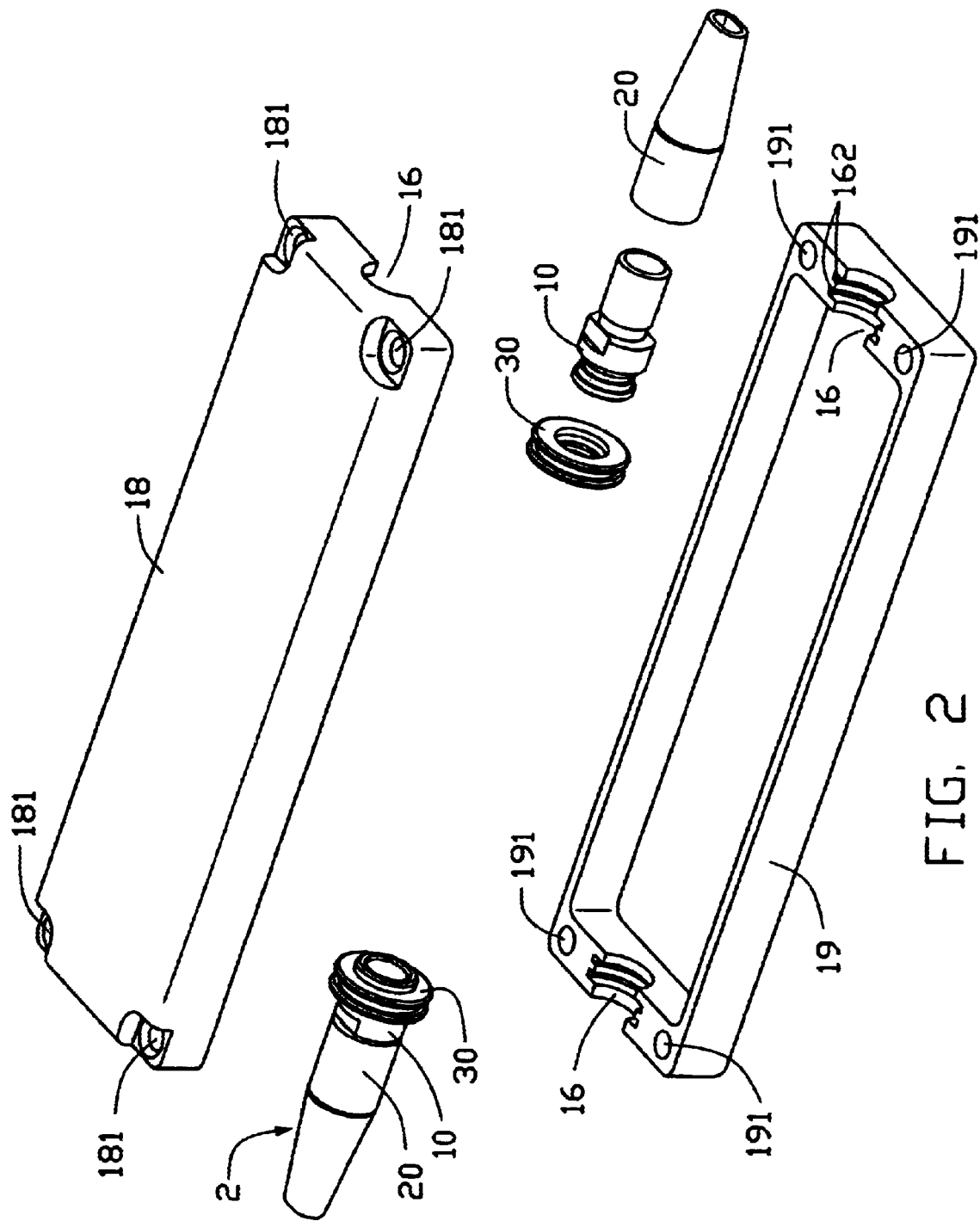
FIG. 2 is an exploded view of FIG. 1.

FIGS. 1 and 2 show an optical fiber device 1 incorporating a pair of optical fiber holders 2 in accordance with the present invention. The optical fiber device 1 comprises a housing having an upper cover 18 and a lower cover 19. Each optical fiber holder 2 comprises a retaining body 10, a strain relief boot 20 engaged around the retaining body 10, and an interconnection member 30 engaged around the retaining body 10 and retained in one of two opposite ends of the optical fiber device 1.

Figure 4:
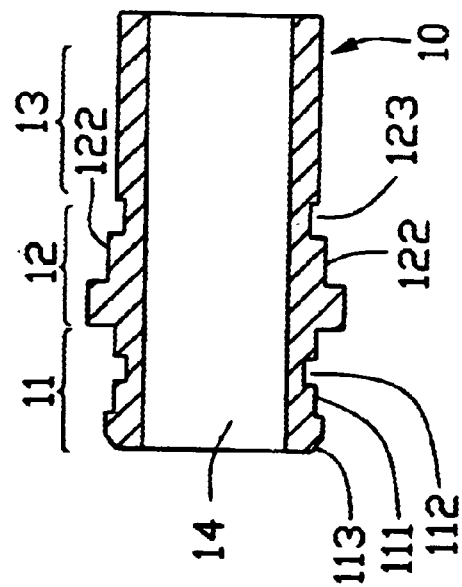
FIG. 4 is a cross-sectional view taken along line IV—IV of FIG. 3.
Figure 3:
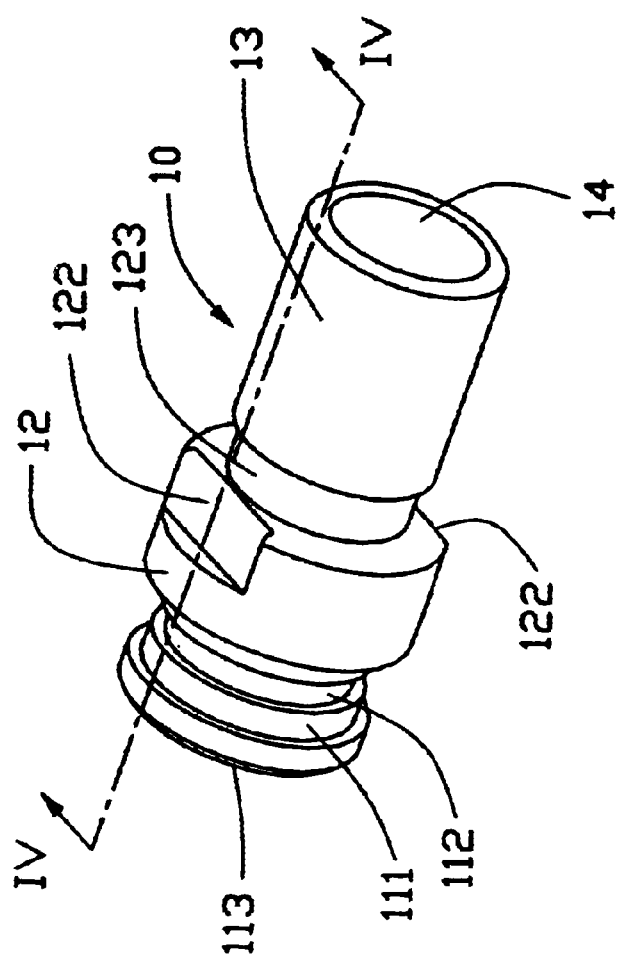
FIG. 3 is a perspective view of a retaining body of one optical fiber holder of FIG. 2.

Referring to FIGS. 3 and 4, each retaining body 10 comprises a front portion 11, an intermediate portion 12 and a rear cylindrical portion 13. An annular recess 111 is defined in an outer circumferential surface of the front portion 11. An annular front groove 112 is defined in the outer circumferential surface of the front portion 11, under and in communication with a middle of the recess 111. The recess 111 and the front groove 112 cooperate to engagingly receive the interconnection member 30. An annular tapered portion 113 is formed at a front end of the retaining body 10, for facilitating insertion of the retaining body 10 into the interconnection member 20. Two symmetric platforms 122 are formed at opposite sides of the intermediate portion 12 respectively, for facilitating clamping of the retaining body 10 during assembly. An annular rear groove 123 is defined in the intermediate portion 12 rearwardly of and adjacent the platforms 122, for engagement of the retaining body 10 in the strain relief boot 30. A first passage 14 is defined in the retaining body 10 along a central longitudinal axis thereof.

Figures 5, 6:
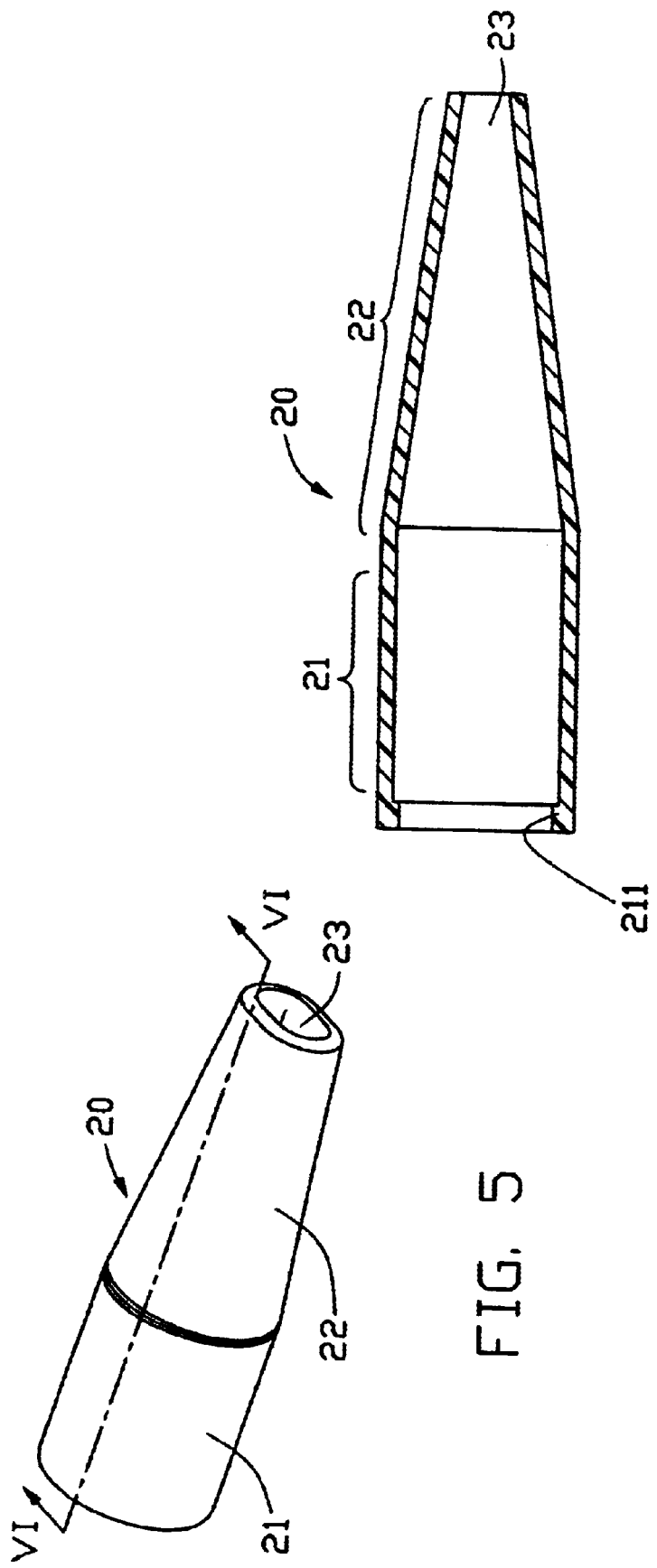
FIG. 5 is a perspective view of a strain relief boot of one optical fiber holder of FIG. 2.
FIG. 6 is a cross-sectional view taken along line VI—VI of FIG. 5.

Referring to FIGS. 5 and 6, each strain relief boot 20 is generally made of rubber or a suitable elastomer. The strain relief boot 20 comprises a front cylindrical portion 21, a rear conical portion 22, and a second passage 23 defined along a central longitudinal axis of the strain relief boot 20. An annular engaging bead 211 is integrally formed on an inside wall of a front end of the strain relief boot 20, for tightly engaging in the rear groove 123 of the retaining body 10. An inner diameter of the front portion 21 is slightly less than an outer diameter of the rear portion 13 of the retaining body 10. An inner diameter of the engaging bead 211 is substantially equal to an outer diameter of the retaining body 10 at the rear groove 123.

Figure 8:
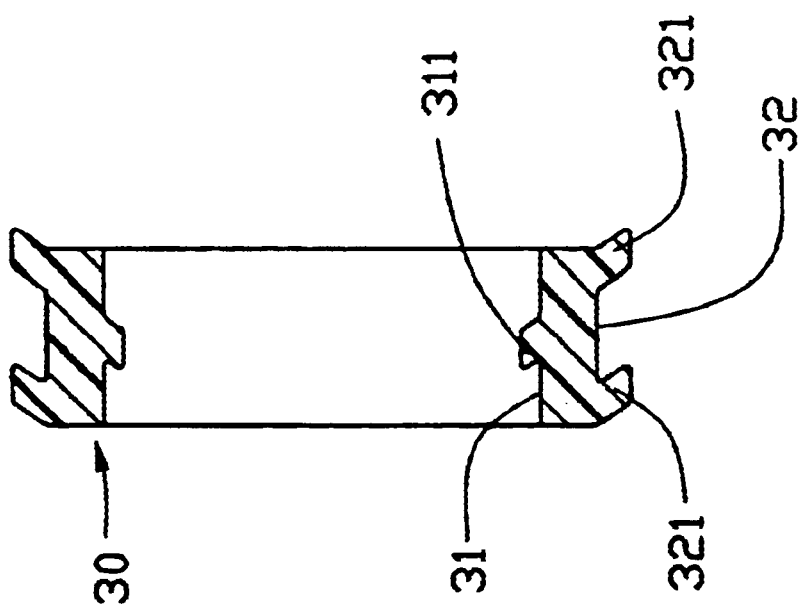
FIG. 8 is a cross-sectional view taken along line VIII—VIII of FIG. 7.
Figure 7:
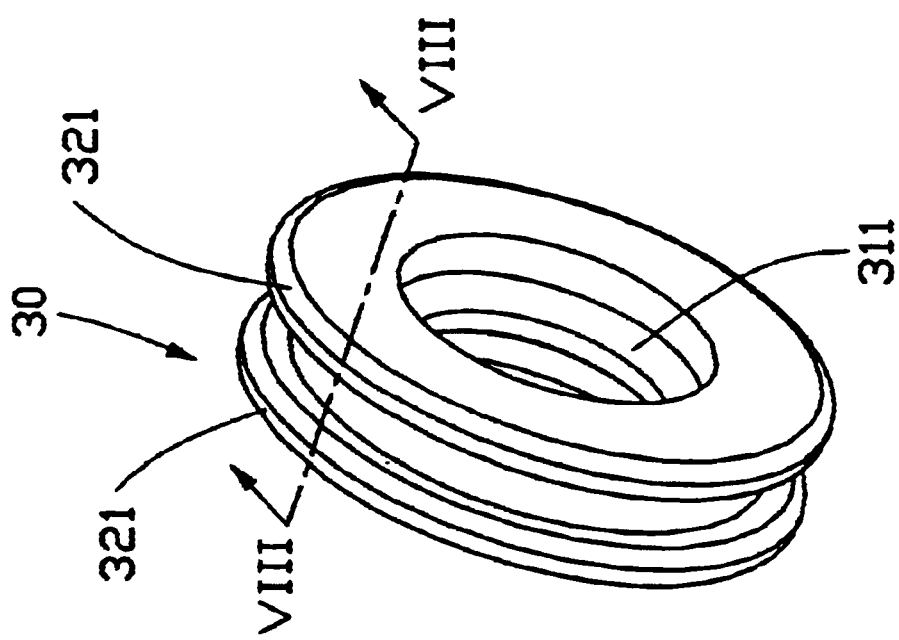
FIG. 7 is a perspective view of an interconnection member of one optical fiber holder of FIG. 2.

Referring to FIGS. 7 and 8, each interconnection member 30 is generally a torus and made of rubber or a suitable elastomer. The interconnection member 30 comprises an inner surface 31, and an outer surface 32. An annular inner rib 311 is formed on a middle portion of the inner surface 31. The inner rib 311 extends slightly forwardly from an outmost extremity to an inmost extremity thereof, for facilitating insertion of the front portion 11 of the retaining body 10 into the interconnection member 30. Two parallel annular outer ribs 321 are formed on opposite ends of the outer surface 32 respectively. The outer ribs 321 extend slightly rearwardly from an inmost extremity to an outmost extremity thereof, for firmly engaging with the upper and lower covers 18, 19.

Referring back to FIG. 2, a semi-circular cutout 16 is respectively defined in each opposite end of the upper cover 18 and of the lower cover 19. The cutouts 16 of the upper and lower covers 18, 19 cooperate to receive the corresponding interconnection members 30 and portions of the corresponding retaining bodies 10 therein. Two semi-annular grooves 162 are defined in an inner surface of the upper and lower covers 18, 19 at each semi-circular cutout 16, for engagingly receiving the outer ribs 321 of the corresponding interconnection members 30. Four through holes 181 are defined in four corners of the upper cover 18 respectively. Four screw holes 191 are defined in four corners of the lower cover 19 respectively. The upper and lower covers 18, 19 cooperate to define a space (not labeled) for accommodating opto-electronic devices therein.

Figure 9:
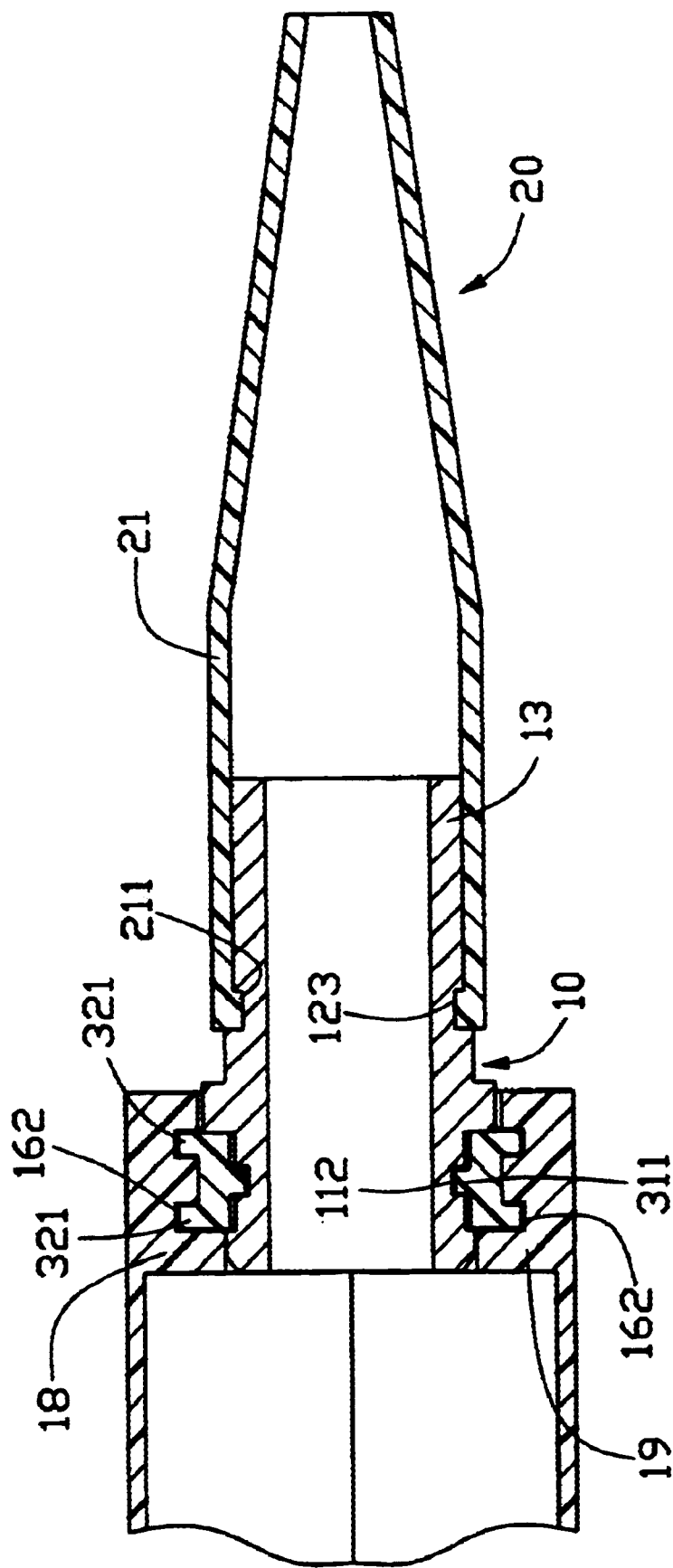
FIG. 9 is a cross-sectional view taken along line IX—IX of FIG. 1.

Referring to FIG. 9, in assembly, the rear portion 13 of each retaining body 10 is firmly engaged in the front portion 21 of the corresponding strain relief boot 20. The engaging bead 211 of the strain relief boot 20 is tightly engaged in the rear groove 123 of the retaining body 10. Thus the retaining body 10 is engaged in the strain relief boot 20 such that the rear portion 13 of the retaining body 10 tightly retains the front portion 21 of the strain relief boot 20 therein. Each interconnection member 30 is engaged around the front portion 11 of the corresponding retaining body 10, and tightly retained in corresponding cutouts 16 of the upper and lower covers 18, 19. The inner rib 311 of the interconnection member 30 is engagingly received in the front groove 112 of the retaining body 10. The outer ribs 321 of the interconnection member 30 are engagingly received in the grooves 162 of the upper and lower covers 18, 19. Four screws (not shown) are extended through the through holes 181 of the upper cover 18 to be engaged in the screw holes 191 of the lower cover 19. Thus assembly of the optical fiber device 1 securely incorporating the optical fiber holders 2 is completed. The first and second passages 14, 23 cooperate to define a passage (not labeled) of the optical fiber holder 2, for receiving at least one optical fiber therethrough.

While the present invention has been described with reference to a particular embodiment, the description is illustrative of the invention and is not to be construed as limiting the invention. Therefore, various modifications to the present invention can be made to the preferred embodiment by those skilled in the art without departing from the true spirit and scope of the invention as defined by the appended claims.

What is claimed is:

1. A sealing assembly for use with an optical fiber holder, comprising:
   top and bottom covers defining cutouts commonly forming a cylindrical opening extending in an axial direction;
   two spaced annular inner grooves formed in said cylindrical opening;
   a tubular retaining body defining an annular outer groove formed in an outer face thereof; and
   an elastic ring type interconnection member radially sandwiched between said covers and said retaining body; wherein
   said interconnection member includes an annular inner rib and two annular outer ribs by two sides of said inner rib in said axial direction, under a condition that said inner rib is received in the corresponding outer groove of the retaining body, and said two outer ribs are received in the corresponding inner grooves of the covers, respectively.

2. An optical fiber device, comprising:
   a housing defining at least one opening therein; and
   at least one optical fiber holder received in the at least one opening of the housing, the at least one optical fiber holder including: a retaining body having a groove defined therein; and
   an interconnection member having a first rib extending from an outer surface thereof for engaging in a groove defined in the opening of the housing, and a second rib extending from an inner surface thereof for engaging in the groove of the retaining body.

3. The optical fiber device as recited in claim 2, wherein the at least one optical fiber holder further comprises a strain relief boot attached to the retaining body.

4. An optical fiber holder for engaging with a housing defining at least one opening therein, the optical fiber holder comprising:
   a retaining body having a groove defined therein; and
   an interconnection member having a first rib extending from an outer surface thereof for engaging in a groove defined in the opening of the housing, and a second rib extending from an inner surface thereof for engaging in the groove of the retaining body.

5. The optical fiber holder as recited in claim 4, further comprising a strain relief boot attached to the retaining body.

* * * * *